June 22, 1954   B. C. HARNEY   2,681,498
EJECTOR MECHANISM FOR BAR FEED MACHINES
Filed June 5, 1951   2 Sheets-Sheet 1
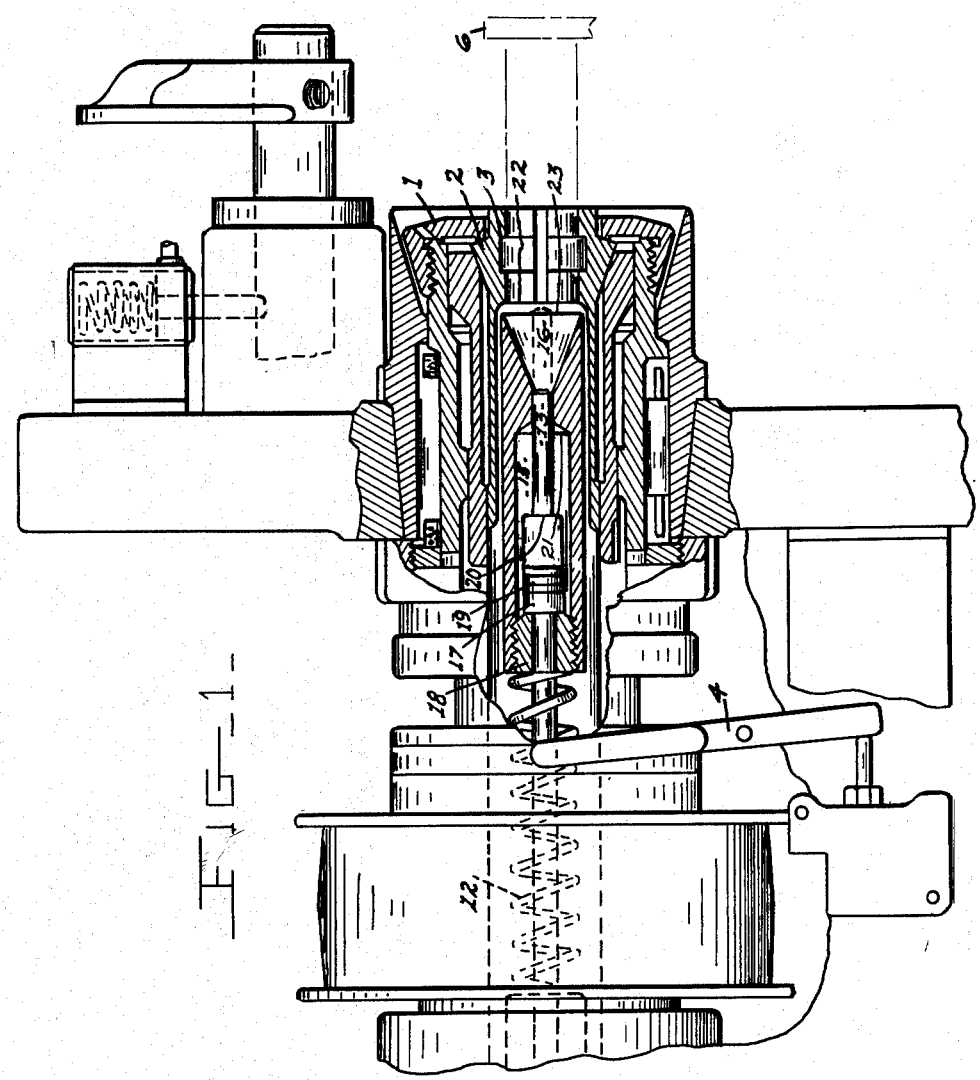
INVENTOR.
BERNARD C. HARNEY
BY Bodell & Thompson
ATTORNEYS June 22, 1954  B. C. HARNEY  2,681,498
EJECTOR MECHANISM FOR BAR FEED MACHINES
Filed June 5, 1951  2 Sheets-Sheet 2
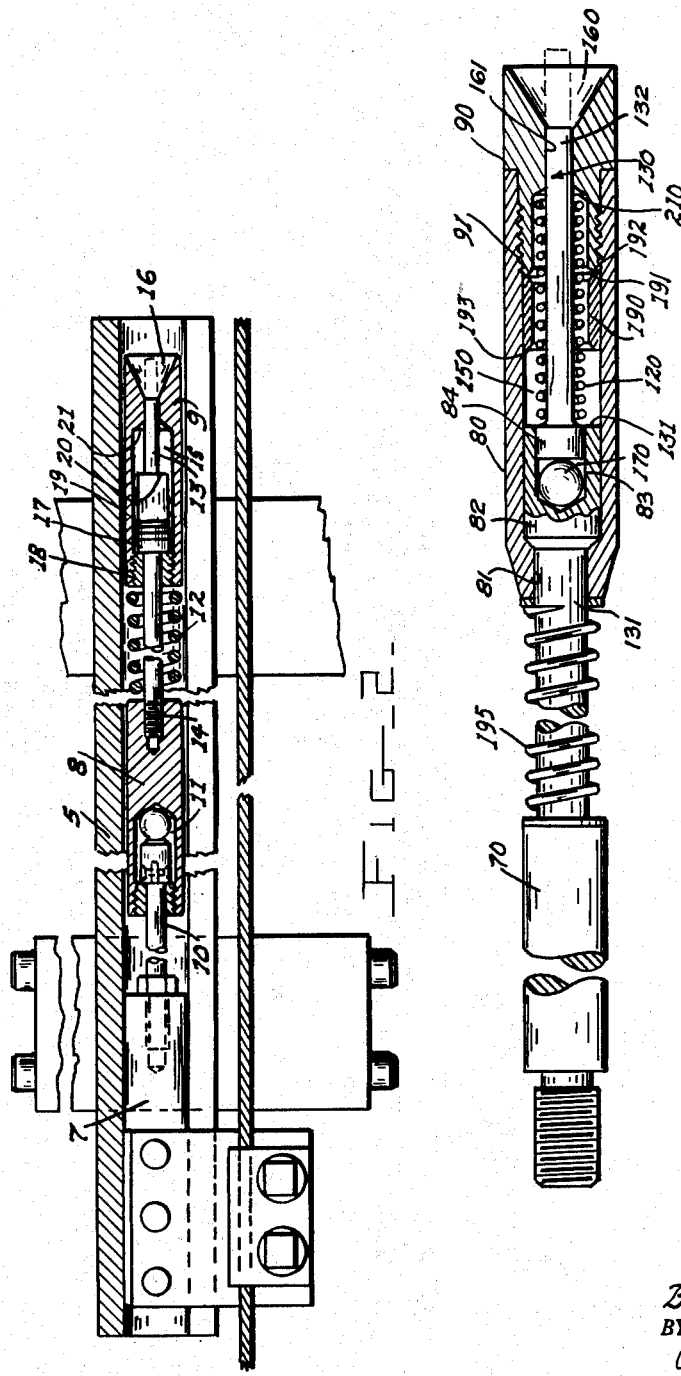
INVENTOR.
BERNARD C. HARNEY
BY Bodell & Thompson
ATTORNEYS Patented June 22, 1954

2,681,498

UNITED STATES PATENT OFFICE 2,681,498

EJECTOR MECHANISM FOR BAR FEED MACHINES

Bernard C. Harney, Syracuse, N. Y., assignor to Lipe-Rollway Corporation, Syracuse, N. Y., a corporation of New York Application June 5, 1951, Serial No. 230,007

3 Claims. (Cl. 29—93)

This invention relates to ejector mechanism for stock bar feeds for automatic metal working machines, and has for its object the construction of a feed plunger for the stock bar having an ejector to eject the remnant of a stock bar a predetermined distance out of the feed plunger into the jaws of the collet, or such a distance that the jaws of the collet will always engage the remnant a sufficient minimum axial length, dependent upon the diameter of the stock bar being operated on, so that a remnant not long enough to reach the stop of the automatic screw machine will fall out when pushed by a new stock bar being fed by the feed plunger.

It is necessary that a remnant be gripped by the collet jaws an axial extent at least equal to the diameter of the stock bar. Thus, it is necessary that the remnant of say one-eighth of an inch stock bar be gripped by the jaws of the collet at least an axial distance of one-eighth of an inch, and that a quarter of an inch stock bar be gripped at least an axial distance of one-quarter of an inch, etc. The ends of the stock bars are usually seated in a conical socket at the advance end of the feed plunger and hence, a stock bar of smaller diameter extends farther into the socket than stock bars of larger diameters.

The purpose of this invention is a mechanism for limiting the movement of the injector into or through the socket of the feed plunger so that a remnant will be gripped by the collet jaws at least an axial distance equal to the diameter of the stock bar and will not be gripped at a less distance if the end of the stock bar when fed engages the stop of the automatic metal working machine. Hence, the projecting end is never infirmly held in the jaws of the collet. Thus, by this invention, no piece of the remnant of the stock bar will be fed out far enough to engage the stop and be infirmly held by the collet.

The invention consists in the novel features and in the combinations and constructions hereinafter set forth and claimed.

In describing this invention, reference is had to the accompanying drawings in which like characters designate corresponding parts in all the views.

This application is a continuation-in-part of my copending application, Ser. No. 37,646, filed July 8, 1948, now Patent No. 2,595,522 granted May 6, 1952.

Figure 1 is a fragmentary elevation, partly in section, of a bar feed mechanism and the contiguous portion of the rotating spindle and collet of a metal working machine and the feed plunger and ejector embodying the feature of this invention, the feed plunger being shown as shifted to the limit of its feeding movement within the spindle and the jaws of the collet.

Figure 2 is a longitudinal, sectional view of the guide for the stock bar and the feed plunger.

Figure 3 is an elevation, partly in section, of a slightly modified form of the feed plunger and ejector.

1 designates the rotating spindle of an automatic metal working machine, and 2 the collet provided with jaws 3 having an opening and closing movement. The spindle is rotated by the usual well known mechanism, and also the collet is operated to open and close its jaws by the usual mechanism. The collet rotates with the spindle. The collet is opened and closed by the usual mechanism including a lever 4. The mechanism for rotating the spindle and the collet, and for opening and closing the collet, form no part of this invention.

As best seen in Figure 2, the stock bar slides in a guide, as a tube 5, and is fed by a feed or pusher plunger axially into the spindle and the collet against a work stop on the turret of the metal working machine, this stop being designated 6 in Figure 1.

The feed plunger, as here shown, is in three sections 7, 8 and 9, these sections being axially spaced so that the section 8 is an intermediate section between the section 7 and the head section 9. The sections 7 and 8 are connected by a neck or rod 10. The section 7 does not pass out of the end of the feed tube 5 into the spindle of the metal working machine. The head section 9, however, does pass into the spindle of the metal working machine and partway into the collet.

The feed plunger section 7 does not rotate with the stock bar when the stock bar is gripped by the collet jaws and hence, the neck 10 is connected to the intermediate section 8 by an antifriction thrust bearing 11.

12 is a compression spring between the intermediate section 8 and the head section 9 to permit the feed plunger sections 7 and 8 to continue to shift axially relatively to the head section 9 when the head section 9 is stopped in its axial shifting movement by coacting stop shoulders on the collet and the ejector, as will be presently described.

13 designates an ejector, this being shown as a rod arranged coaxial with the feed plunger sections 8 and 9 and secured or anchored at its rear end at 14 to the advance end of the intermediate feed plunger section 8 and extending through an axial bore 15 into the head section 9, and also into the conical socket 16 at the advance end of the head section for receiving the ends of stock bars of different diameters. The spring 12 is coiled about the portion of the ejector rod 13 between the intermediate and head sections 8, 9. The ejector rod 13 is limited in its axial movement in a retrograde direction when the feed plunger is on its withdrawal stroke, or any other time, by a stop shoulder, as a collar 17 on the ejector 13 and located to engage a plug 18 threading into the rear end of the bore 15. The bore 15 has a coaxial contracted portion opening through the apex of the wall of the conical socket.

The stop shoulders, above referred to for limiting the shifting of the ejector rod 13 to a predetermined distance into or through the conical socket 16, the distance being dependent upon the diameter of the rods being worked, are provided by spacing means here shown, in Figures 1 and 2, as shims, washers, or sleeves 19 encircling the ejector rod 13 and abutting against the collar 17, the distance between the ends of the shims and the end wall of the bore 15 of the head section 9 being the distance it is desired to project the end of the ejector rod 13 into or through the conical socket 16, as indicated in dotted line. The surface 20 of the end shim and the end wall 21 of the bore 15 constitute the shoulders for limiting the movement of the ejector rod into or through the conical socket 16. When a batch of bars of a different diameter than those being worked on are to be processed in the machine, the feed plunger is removed and the number of shims of washers 19 increased or decreased and adjusted so that the end of the ejector 15 will project the proper predetermined distance into the conical socket 16. For bars of smaller diameter, say ⅛ of an inch, there will be more shims than when a bar of larger diameter, say one-quarter, or one-half inch, are to be processed. The head section 9 is limited in its feeding movement by coacting stop shoulders 22, 23, on the rear side of the collet jaws and on the advance end of the feed plunger section 9—that is, at the outer end of the conical socket 16, Figure 1.

Thus in operation, when the feed plunger feeds into the spindle to the limit of its movement and is stopped by the shoulder 23 engaging the shoulder 22 of the collet, further feeding of the feed plunger sections 7 and 8 compress the spring 12 and the ejector 15 is shifted axially a predetermined distance into or through the conical socket 16 in accordance with the diameter of the stock bar being operated on, so that the remnant of the stock bar is held firmly by the jaws of the collet. As before stated, the remnant will be gripped at least an axial distance equal to the diameter of the stock bar.

In Fig. 3, a slightly modified form of the feed plunger and ejector assembly is shown. The head section is comprised of rear and front portions 80 and 90 threadedly joined together at 91 and providing an enclosed enlarged bore 150. Aligned openings at 81 and 161 are adapted to receive the ejector rod 130 therethrough. The latter rod is in two sections 131 and 132, section 131 being an axial extension of the second section 70 and having an enlargement at 82 provided with a recess 83, and the forward rotatable section 132 having an enlargement at 84 received in the recess 83 and thrustingly engaged against the antifriction bearing 170 in the recess while its other end extends into the socket 160, for engagement with the bar stock and rotation therewith relative to the rear rod portion 131.

A compression spring 120 surrounds the ejector 130 and is interposed between the enlargement or collar 84 at the rear of the ejector section 132 and on an outer end wall portion of the bore 150 at 210. The movement of the ejector 130 into and through the socket 160 is limited by a spacer means consisting of a sleeve 190 in the bore 150 and encircling the spring 120 and thrusting at 191 at one end against an internal shoulder 192 in the front head portion 90 and having its other end 193 arranged in the path of the advance end of the non-rotatable rod portion 131. The spacer is cut to such axial length as to limit the movement of the ejector 130 to project the desired distance into and through the socket 160 in accordance with the diameter of the bars being operated on. A relatively stiff cushion spring 195 is interposed between the feed plunger sections 70 and 80. The operation of the construction shown in Figure 3 is the same as that of Figures 1 and 2, with the exception that the spacer means in Figure 3 for limiting the distance the ejector moves into the conical socket 160 or 16, is a sleeve in the bore of the head section instead of shims or washers on the ejector rod.

What I claim is:

1. A mechanism for feeding step by step bar stock to the rotatable spindle and the collet of metal working machines, said mechanism comprising a push plunger consisting of a head section and a second section axially spaced rearwardly therefrom said head section having forward and rear portions detachably secured together, said portions being formed with aligned apertures and having an enlarged enclosed bore intermediate said apertures, said forward portion also having a conical socket for receiving the end of a stock bar, an ejector rod projecting from the second section axially through said apertures in the head section for sliding movement therein and a compression spring between the sections, there being a coacting shoulder on the collet and the head section to limit movement of the head section into the collet, the end of the ejector rod being movable into the conical socket when the movement of the head section is stopped by said shoulders, and means in said bore for limiting the relative axial movement of the second section and the head section against said compression spring and to limit the distance the end of the ejector rod projects through the conical socket, and to thereby position the end remnant of the bar for proper gripping by the collet.

2. A mechanism for feeding step by step bar stock to the rotatable spindle and the collet of metal working machines, said mechanism comprising a push plunger consisting of a head section and a second section axially spaced rearwardly therefrom, said head section having forward and rear portions detachably secured together, said portions being formed with alined apertures and having an enlarged enclosed bore intermediate said apertures, said forward portions also having a conical socket for receiving the end of a stock bar, an ejector rod projecting from the second section axially through said apertures in the head section for sliding movement therein, and a compression spring between the sections, there being a coacting shoulder on the collet and the head section to limit movement of the head section into the collet, the end of the ejector rod being movable into the conical socket when the movement of the head section is stopped by said shoulders, said ejector rod being formed with an enlargement normally positioned against the end wall of the bore in said rear portion of the head section, and a spacer element removably mounted in said bore and being interposed between the enlargement on the ejector rod and the end wall of the bore in said forward portion to limit forward axial movement of the ejector rod relative to the head section into said socket to a predetermined distance when said spring is compressed and to thereby position the end remnant of the bar for proper gripping by the collet.

3. A mechanism for feeding step by step bar stock to a rotatable spindle and the collet of metal working machines, said mechanism comprising a push plunger consisting of a head section and a second section axially spaced rearwardly therefrom, said head section having forward and rear portions detachably secured together and being formed with alined apertures, and having an enlarged enclosed bore intermediate said apertures, said forward portion being also formed with a conical socket for receiving the end of a stock bar, an ejector rod extending from the second section axially through the aperture in said rear portion for sliding movement therein, and a compression spring between the sections, there being a coacting shoulder on the collet and the forward portion of the head section to limit movement of the head section into the collet, said ejector rod having a forward end portion mounted for rotation in the head section and extending through the aperture in said forward portion of the head section, said rod having an enlargement normally engaging the end wall of said bore in the rear portion, and a spacer element detachably mounted in said bore and being positioned between the enlargement of said rod and the end wall of the bore in said forward portion, said spacer being of such dimensions to limit forward movement of said rod relative to the head section and to thereby position the end remnant of the bar for proper gripping by the collet.

References Cited in the file of this patent

UNITED STATES PATENTS

| Number | Name | Date |
| --- | --- | --- |
| 1,808,452 | Cousins | June 2, 1931 |
| 2,339,712 | Mariotte | Jan. 18, 1944 |
| 2,572,741 | McCoy | Oct. 23, 1951 |
| 2,601,494 | Baule | June 24, 1952 |